United States Patent
Schacht et al.

(10) Patent No.: US 11,994,193 B2
(45) Date of Patent: May 28, 2024

(54) COMPACT DRIVELINE

(71) Applicant: Dana Belgium N.V., Bruges (BE)

(72) Inventors: Filip Schacht, Meulebeke (BE); Kurt Cattoor, Koolkerke (BE)

(73) Assignee: DANA BELGIUM N.V., Bruges (BE)

( * ) Notice: Subject to any disclaimer, the term of this patent is extended or adjusted under 35 U.S.C. 154(b) by 43 days.

(21) Appl. No.: 17/644,313

(22) Filed: Dec. 14, 2021

(65) Prior Publication Data
US 2022/0185105 A1  Jun. 16, 2022

(30) Foreign Application Priority Data

Dec. 15, 2020  (DE) ............... 20 2020 107 259.5

(51) Int. Cl.
*F16H 3/08* (2006.01)
*B60K 7/00* (2006.01)
*F16H 37/04* (2006.01)

(52) U.S. Cl.
CPC ............ *F16H 3/08* (2013.01); *B60K 7/0007* (2013.01); *F16H 2037/049* (2013.01); *F16H 2200/0034* (2013.01); *F16H 2200/2064* (2013.01)

(58) Field of Classification Search
CPC .... F16H 3/08; F16H 3/091; F16H 2003/0822; F16H 37/041; F16H 2037/049; F16H 41/00; F16H 47/07; F16H 2200/003; F16H 2200/0082; F16H 57/021; F16H 2057/0203; B60K 7/0007
See application file for complete search history.

(56) References Cited

U.S. PATENT DOCUMENTS

| | | | |
|---|---|---|---|
| 5,186,065 A * | 2/1993 | Downs | F16H 3/093 74/331 |
| 2002/0033062 A1* | 3/2002 | Obinata | F16H 3/093 74/331 |

(Continued)

FOREIGN PATENT DOCUMENTS

| | | | | |
|---|---|---|---|---|
| BR | 102016013118 A2 * | 2/2017 | | B60K 17/02 |
| CN | 385586 A * | 12/1964 | | |
| CN | 109505930 A * | 3/2019 | | F16H 3/006 |

(Continued)

OTHER PUBLICATIONS

FR 2221979 A5 (Hurth Maschinen Zahnradfabrik) Oct. 11, 1974 (specification). [online] [retrieved on Mar. 23, 2023]. Retrieved from Espacenet (Year: 1974).*

(Continued)

*Primary Examiner* — Joseph Brown
(74) *Attorney, Agent, or Firm* — McCoy Russell LLP

(57) ABSTRACT

A system for a driveline is provided. In one example a driveline may include a first and a second input shaft gear disposed on an input shaft. In one example, the first input shaft gear may selectively drivingly engage with the input shaft via a first clutch and the second input shaft gear may selectively drivingly engage with the input shaft via a second clutch. In another example, a first and a second counter shaft gear may be disposed on a countershaft and drivingly engage with the countershaft, wherein the first input shaft gear drivingly engages with the first countershaft gear and the second input shaft gear is drivingly engages with the second countershaft gear via an idler gear.

17 Claims, 2 Drawing Sheets

(56) References Cited

U.S. PATENT DOCUMENTS

2008/0282823 A1\* 11/2008 Kim ................ F16H 37/043
  74/329
2018/0031096 A1\* 2/2018 Blattner ................ F16H 61/70

FOREIGN PATENT DOCUMENTS

| DE | 102011081765 A1 \* | 2/2013 | ............... B60K 6/48 |
| DE | 202011111064 U1 | 2/2019 | |
| EP | 2228249 A1 \* | 9/2010 | ............. B60K 17/04 |
| FR | 1230353 A \* | 9/1960 | |
| FR | 2221979 A5 \* | 10/1975 | |

OTHER PUBLICATIONS

DE 102011081765 A1 (Manuel Goetz) Feb. 28, 2013 (full text). [online] [retrieved on Mar. 23, 2023]. Retrieved from Clarivate Analytics. (Year: 2013).\*

"ATI Bolt Together Racing Torque Converters for Drag Racing and High Horsepower Use!" ATI Performance Products, Jul. 5, 2020, web.archive.org/web/20200705110237/www.atiracing.com/products/torque_converter/bolt_together_torque_converters.html. Accessed Oct. 19, 2023. (Year: 2020).\*

\* cited by examiner

COMPACT DRIVELINE

CROSS-REFERENCE TO RELATED APPLICATION

The present application claims priority to German Utility Model No. 20 2020 107 259.5, entitled "COMPACT DRIVELINE", and filed on Dec. 15, 2020. The entire contents of the above-listed application is hereby incorporated by reference for all purposes.

TECHNICAL FIELD

The present disclosure relates to a compact driveline. Drivelines of the presently proposed type may be used in compact lift truck material handling applications, for example.

BACKGROUND AND SUMMARY

DE 20 2011 111 064 U1 discloses a driveline layout of a mobile working machine with a drive train with a primary drive device and with a main gearbox as well as with at least one group gearbox and with a reversing gearbox for reversing the direction of rotation as well as with at least one power take-off, wherein a secondary drive device is provided on the drive train, which is connected to the primary drive device and is arranged on the main gearbox input side of the drive train behind the primary drive device in the output direction.

The installation space available for drivelines in compact lift truck material handling applications, such as in small material handling vehicles, is very limited. Therefore, there is a need for compact drivelines with a short length between engine and output flange. In addition, the drivelines may provide efficient and wear-resistant forward and reverse drive modes, as intense loading and unloading operations, for example, typically involve frequent forward and backward shuttling duties.

It is an object of the present disclosure to provide a driveline that addresses the aforementioned requirements. For instance, it may be an object of the present disclosure to provide a driveline with a high degree of compactness, high transmission efficiency and a long service life.

This object is solved by a driveline disclosed herein.

The presently proposed driveline comprises:

a first and a second input shaft gear disposed on an input shaft, wherein the first input shaft gear is selectively drivingly engaged with the input shaft via a first clutch and the second input shaft gear is selectively drivingly engaged with the input shaft via a second clutch, and a first and a second counter shaft gear disposed on a countershaft and drivingly engaged with the countershaft, wherein the first input shaft gear is drivingly engaged with the first countershaft gear and the second input shaft gear is drivingly engaged with the second countershaft gear via an idler gear.

The first input shaft gear may be in meshing engagement with the first countershaft gear. In addition or alternatively, the second input shaft gear may be in meshing engagement with the idler gear and/or the idler gear may be in meshing engagement with the second countershaft gear. A direct meshing engagement of the gears minimizes transmission losses and provides a high degree of compactness of the driveline.

The first and the second clutch of the proposed driveline may be disposed on the input shaft. In addition or alternatively, the first and/or the second clutch may be coaxial with the input shaft. Furthermore, the first countershaft gear and/or the second countershaft gear may be rigidly mounted on the countershaft. As a result, the compactness of the driveline may be increased.

The gears of the proposed driveline may be chosen accordingly to provide an absolute value of a first gear ratio between the first input shaft gear and the first countershaft gear being equal to an absolute value of a second gear ratio between the second input shaft gear and the second countershaft gear. In addition or alternatively, the absolute value of the first gear ratio and/or the second gear ratio can be equal to one.

The driveline may further comprise an output shaft and an output shaft gear. The output shaft gear may be disposed on and drivingly engaged with the output shaft. The output shaft gear may be in meshing engagement with the first countershaft gear. For instance, the output shaft gear is rigidly mounted on the output shaft.

The proposed driveline may provide a 1×1 transmission. Accordingly, an absolute value of a drive ratio between the input shaft and the output shaft may be equal to one.

In one embodiment, the driveline may comprise an engine in driving engagement with the input shaft.

The output shaft of the engine can be rigidly connected to or made in one piece with the input shaft.

Alternatively, the driveline may further include a torque converter. The torque converter may comprise an impeller portion and a turbine portion. The engine may be drivingly engaged with the impeller portion. The output shaft of the turbine portion may be made in one piece with the input shaft. As a result, the proposed driveline provides a powershift transmission, thus allowing for a reliable operation and controllability and lower overall costs of operation.

In a further embodiment, the driveline may include a power take-off drivingly connected to the engine.

The first and/or the second clutch of the proposed driveline may be a friction clutch, a dog clutch or a synchronizer clutch. In an embodiment, both clutches are multi-plate clutches.

BRIEF DESCRIPTION OF THE FIGURES

Embodiments of the presently proposed driveline are described in the following detailed description and are illustrated in the accompanying figures in which.

DETAILED DESCRIPTION

Figure 1:
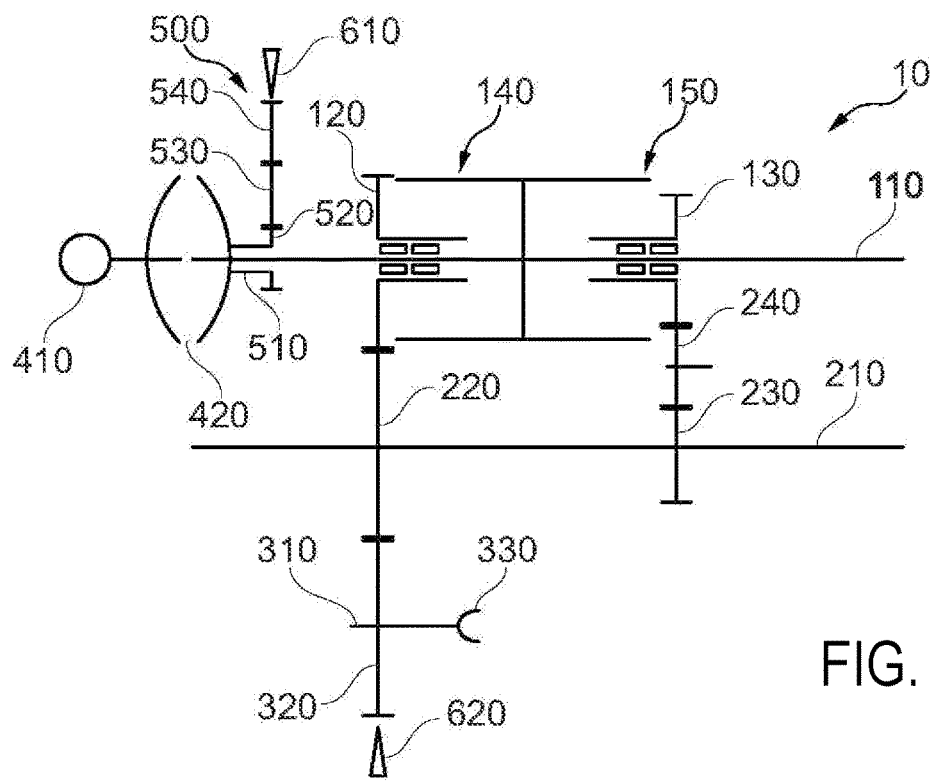
FIG. 1 shows a schematic illustration of a driveline according to an embodiment of the present disclosure.

In FIG. 1, a driveline 10 according to one embodiment is illustrated in a schematic view. The driveline 10 may be used or disposed in a lift truck vehicle, for example. However, the driveline 10 may be used in other types of vehicles. For example, a torque produced by the driveline 10 may be transferred to the wheels of the vehicle for propelling the vehicle. The driveline 10 includes an input shaft 110 with a first and a second input shaft gear 120, 130 disposed on the input shaft 110. The driveline 10 includes a first and a second clutch 140, 150 for respectively selectively engaging the first input shaft gear 120 with the input shaft 110 and the second input shaft gear 130 with the input shaft 110. Further, the driveline 10 includes a countershaft 210 with a first countershaft gear 220 and a second countershaft gear 230 disposed on the countershaft 210 and drivingly engaged with the countershaft 210. For example, the first and the second countershaft gears 220, 230 may be rigidly mounted on the countershaft 210. The first input shaft gear 120 is drivingly engaged with the first countershaft gear 220 and the second input shaft gear 130 is drivingly engaged with the second countershaft gear 230 via an idler gear 240.

Further, the first and the second clutch 140, 150 are disposed on the input shaft 110 and coaxial with the input shaft 110. For example, the first and the second clutch 140, 150 may comprise a common outer plate carrier and may each include a separate inner plate carrier. The outer plate carrier may be rigidly connected to the input shaft 110, and the inner plate carrier of the first clutch 140 and the inner plate carrier of the second clutch 150 may be connected to or engaged with the first input shaft gear 120 and the second input shaft gear 130, respectively. For example, the outer plate carrier can be connected to or engaged with the input shaft 110, and the first and the second input shaft gears 120, 130 can be provided on hollow shafts coaxially disposed on the input shaft 110 and selectively engaged with the input shaft via the first and the second clutch 140, 150.

In general, the first and/or the second clutch 140, 150 can include a friction clutch, a dog clutch, or a synchronizer clutch, for example. However, it is understood that the first clutch 140 and/or the second clutch 150 may include other types of clutching devices configured to selectively drivingly engage the input shaft gears 120, 130 with the input shaft 110. For instance, both clutches are multi-plate clutches.

The driveline 10 further includes an output shaft 310 with an output shaft gear 320 disposed on and drivingly engaged with the output shaft 310. The output shaft gear 320 may be rigidly mounted on the output shaft 310. The output shaft 310 comprises an output flange 330 for transferring torque to the wheels of a vehicle, for example.

According to the presented embodiment, the first input shaft gear 120 is in meshing engagement with the first countershaft gear 220, the second input shaft gear 130 is in meshing engagement with the idler gear 240, and the idler gear 240 is in meshing engagement with the second countershaft gear 230. The output shaft gear 320 is in meshing engagement with the first countershaft gear 220. It is understood that the driveline 10 may comprise alternative layouts, wherein further gears and/or clutches are provided to drivingly engage the input shaft 110 with the output shaft 310. However, the presently described embodiment reduces or minimizes transmission losses between the input shaft 110 and the output shaft 310 and may have a compact layout.

An absolute value of a first gear ratio between the first input shaft gear 120 and the first countershaft gear 220 may be equal to an absolute value of a second gear ratio between the second input shaft gear 130 and the second countershaft gear 230. For instance, the absolute value of the first gear ratio and the absolute value of the second gear ratio may be equal to one. In addition, an absolute value of a drive ratio between the input shaft 110 and the output shaft 310 may be equal to one. As a result, a 1×1 transmission with two drive modes is provided. A forward drive mode is provided by engaging the first clutch 140 and by disengaging the second clutch 150, and a reverse drive mode is provided by engaging the second clutch 150 and by disengaging the first clutch 140.

For instance, the first input shaft gear 120, the first countershaft gear 220 and the output shaft gear 320 may comprise an equal number of gear teeth. In addition, the second input shaft gear 130 and the second countershaft gear 230 may comprise an equal number of gear teeth. The number of gear teeth of the first input shaft gear 120, the first countershaft gear 220 and of the output shaft gear 320 may be larger than a number of gear teeth of the idler gear 240, and the number of gear teeth of the idler gear 240 may be larger than the number of gear teeth of the second input shaft gear 130 and the second countershaft gear 230. For example, the number of gear teeth of the first input shaft gear 120, the first countershaft gear 220 and of the output shaft gear 320 may be 54, the number of gear teeth of the idler gear 240 may be 28, and the number of gear teeth of the second input shaft gear 130 and the second countershaft 230 gear may be 27.

The driveline 10 may further include an engine 410 in driving engagement with the input shaft 110 through a torque converter 420. The torque converter 420 comprises an impeller portion and a turbine portion, wherein the engine 410 is drivingly engaged with the impeller portion and the input shaft 110 is drivingly engaged with an output shaft of the turbine portion. For instance, the input shaft 110 may be made in one piece with the output shaft of the turbine portion.

However, as an alternative, the engine 410 may be directly drivingly engaged with the input shaft 110 and, for instance, the output shaft of the engine 410 may be made in one piece with the input shaft 110.

The engine 410 may be or may comprise a combustion engine, e.g. a diesel engine or an LP gas engine, an electric engine, or a hybrid engine.

The driveline 10 according to FIG. 1 further includes a power take-off (PTO) gear train 500. The exemplary PTO gear train 500 provided in FIG. 1 comprises a first PTO gear 520, a second PTO gear 530 and a third PTO gear 540. The first PTO gear 520 is disposed on a PTO input shaft 510 and drivingly engaged with the PTO input shaft 510. The first PTO gear 520 can be rigidly mounted on the PTO input shaft 510. The PTO input shaft 510 can be a hollow shaft. In addition, the PTO input shaft 510 can be disposed coaxially with the input shaft 110. The PTO input shaft 510 is drivingly engaged with the engine 410. The PTO input shaft 510 may be drivingly engaged with the output shaft of the turbine portion of the torque converter 420, for example. For instance, the PTO input shaft 510 may be in mesh with the turbine portion. The second PTO gear 530 may be in driving and meshing engagement with the first PTO gear 520 and the third PTO-gear 540.

The PTO gear train may provide an additional power output for a working function and/or the driveline 10 itself. For instance, the PTO gear train 500 may drive a driveline hydraulic pump, for example for actuation of the first and the second clutch 140, 150, and/or drive a working function hydraulic pump, for example for fork lift working operations. The power outputs of the PTO gear train 500 may be drivingly engaged with the third PTO gear 540 and/or the third PTO gear 540 and the second PTO gear 530. An absolute value of a gear ratio between the third PTO gear 540 and the first PTO gear 520 may be smaller than one. An absolute value of a gear ratio between the second PTO gear 530 and the first PTO gear 520 may be smaller than one. For example, the number of gear teeth of the first PTO gear 520 may be 35, the number of gear teeth of the second PTO gear 530 may be 31, and the number of gear teeth of the third PTO gear 540 may be 34.

Finally, the driveline 10 provided in FIG. 1 includes an input speed sensor 610 and an output speed sensor 620, for operation control. The input sensor 610 is connected to the third PTO gear 540, the output speed sensor 620 is connected to the output shaft gear 320. The input sensor may be used to derive the engine speed, the output speed sensor may be used to derive the output speed of the output flange.

Figure 2:
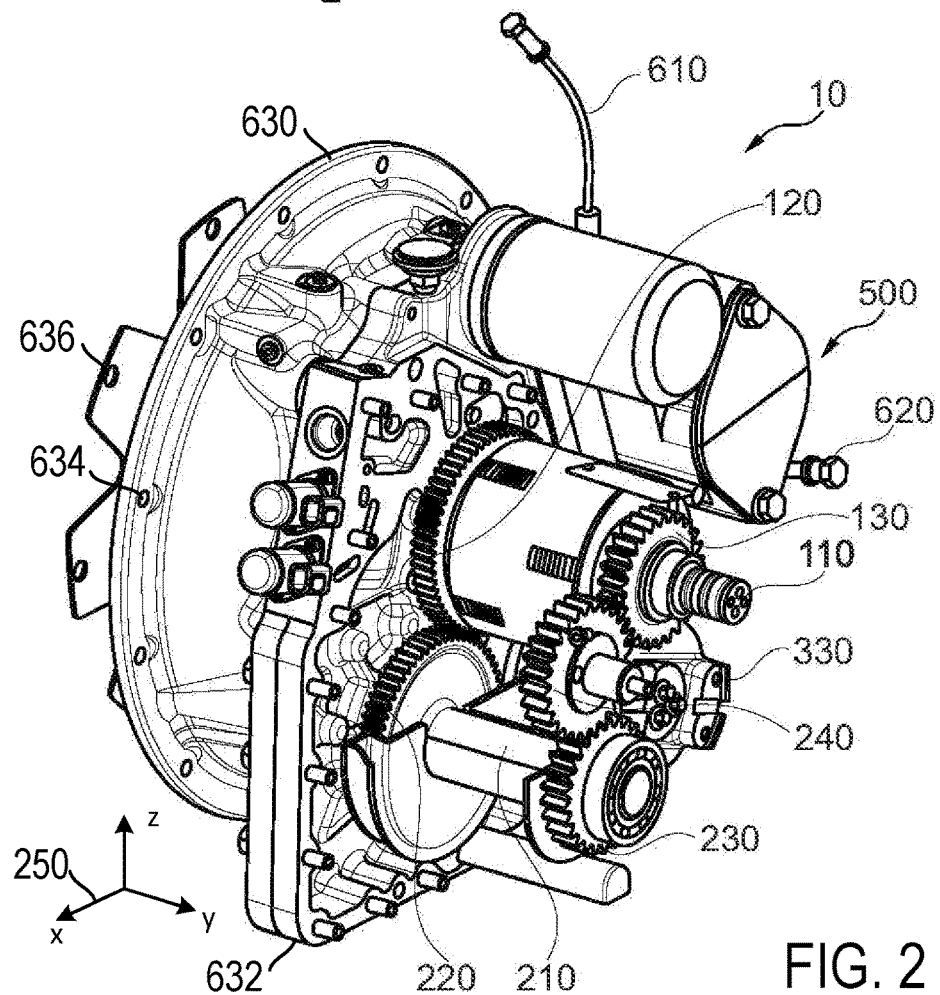
FIG. 2 shows a first perspective view of the driveline shown in FIG. 1.
Figure 3:
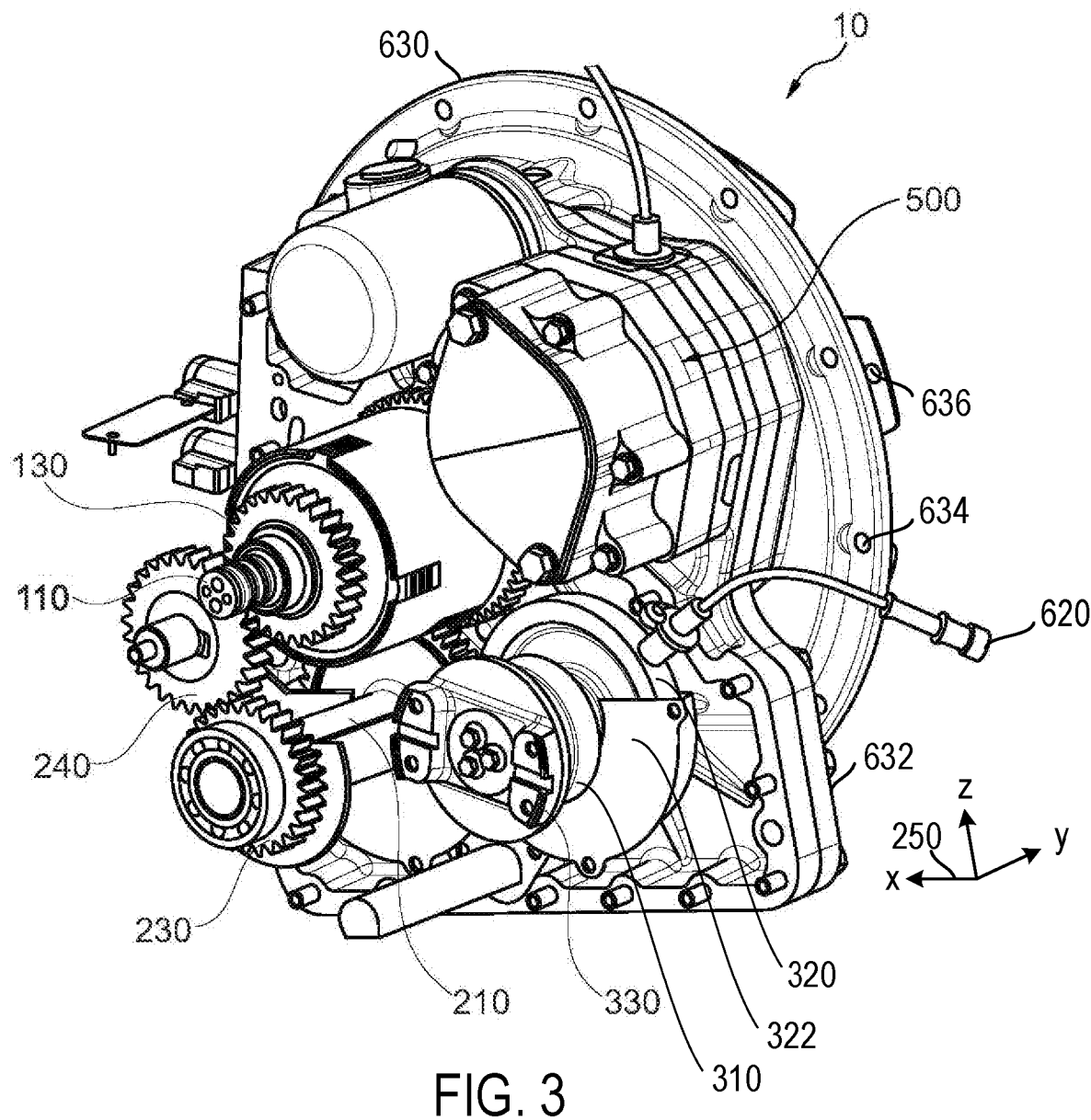
FIG. 3 shows a second perspective view of the driveline shown in FIG. 1.

FIGS. 2 and 3 show different perspective views of the driveline 10 according to FIG. 1. The input shaft 110, the countershaft 210, the output shaft 310, and the PTO gear train 500 are mounted on a backplate 630 of the turbine portion of the torque converter. The input shaft 110, the countershaft 210, the output shaft 310, and the PTO gear train 500 are affixed within a plate 632 parallel with the backplate 630. An axis system 250 is given in FIGS. 2 and 3.

FIG. 2 shows a first perspective view driveline 10 with the first input shaft gear 120 of the input shaft 110 drivingly engaged with the first countershaft gear 220 of countershaft 210. The second input shaft gear 130 of the input shaft 110 is drivingly engaged with the second countershaft gear 230 of the countershaft 210 via idler gear 240. Output flange 330 is shown as a face of the output shaft (not shown) parallel to the backplate 630. The input speed sensor 610 is mounted to the PTO gear train 500. The output speed sensor 620 is affixed to the output gear (not shown). The backplate 630 includes a plurality of through holes 634, 636. The backplate 630 is affixed to the turbine portion of the torque converter by a plurality of fasteners, e.g., bolts, screws.

FIG. 3 shows a second perspective view of driveline 10. In this view, the second input shaft gear 130 of the input shaft 110 is shown drivingly engaged with the second countershaft gear 230 of the countershaft 210 via idler gear 240. The output shaft gear 320 is shown circumferentially mounted to the output shaft 310. The output flange 330 of output shaft 310 is shown. The output speed sensor 620 is mounted to the output shaft gear 320. The output shaft gear 320 is partially enclosed by a cover 322. The backplate 630 and through holes 634, 636 are shown.

The powershift driveline presented herein may provide a power output of up to 60 kW while keeping a very short length form engine to output flange.

It will be appreciated that the configurations herein are exemplary in nature, and that these specific examples are not to be considered in a limiting sense, because numerous variations are possible. For example, the above technology can be applied to a variety of systems that include electric motors. The subject matter of the present disclosure includes all novel and non-obvious combinations and sub-combinations of the various systems and configurations, and other features, functions, and/or properties disclosed herein.

As used herein, the terms "approximately" and "substantially" are construed to mean plus or minus five percent of the range unless otherwise specified.

FIGS. 2-3, drawn to scale, show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A driveline, comprising:
   a first input shaft gear and a second input shaft gear disposed on an input shaft, wherein the first input shaft gear is selectively drivingly engaged with the input shaft via a first clutch and the second input shaft gear is selectively drivingly engaged with the input shaft via a second clutch;
   a first countershaft gear and a second countershaft gear disposed on a countershaft and drivingly engaged with the countershaft; wherein
      the first input shaft gear is drivingly engaged with the first countershaft gear and the second input shaft gear is drivingly engaged with the second countershaft gear via an idler gear; and
   an output shaft and an output shaft gear disposed on and drivingly engaged with the output shaft,
   wherein the output shaft gear is in meshing engagement with the first countershaft gear,
   wherein the input shaft, the countershaft, a power take-off (PTO) gear train, and the output shaft are affixed within a plate at a surface of the plate that faces away from a backplate of a turbine portion of a torque converter, and wherein the plate is parallel with the backplate of the turbine portion of the torque converter,
   wherein the plate is coupled to the backplate of the turbine portion, and
   wherein the first input shaft gear is mounted to the surface of the plate.

2. The driveline according to claim 1, wherein the first input shaft gear is in meshing engagement with the first countershaft gear, the second input shaft gear is in meshing engagement with the idler gear, and the idler gear is in meshing engagement with the second countershaft gear.

3. The driveline according to claim 1, wherein the first clutch and the second clutch are disposed on and coaxial with the input shaft.

4. The driveline according to claim 1, wherein the first countershaft gear and the second countershaft gear are rigidly mounted on the countershaft.

5. The driveline according to claim 1, wherein the output shaft gear is rigidly mounted on the output shaft.

6. The driveline according to claim 1, further comprising an engine in driving engagement with the input shaft.

7. The driveline according to claim 1, wherein the torque converter comprises an impeller portion and the turbine portion, and wherein an engine is drivingly engaged with the impeller portion.

8. The driveline according to claim 7, wherein the PTO gear train is drivingly engaged or in mesh with the impeller portion.

9. The driveline according to claim 1, wherein the first clutch and/or the second clutch is a friction clutch, a dog clutch, or a synchronizer clutch.

10. The driveline according to claim 1, wherein the first clutch and the second clutch are multi-plate clutches.

11. The driveline according to claim 1, wherein the surface of the plate facing away from the backplate forms part of an exterior surface of the driveline.

12. The driveline according to claim 1, wherein the backplate comprises a plurality of through holes.

13. The driveline according to claim 12, wherein the plurality of through holes includes a first set of holes and a second set of holes at radially different positions.

14. The driveline according to claim 13, wherein the first set of holes is formed into extensions of the backplate, and wherein the second set of holes is formed into a rim of the backplate.

15. The driveline according to claim 1, wherein the first input shaft gear and the first countershaft gear are further positioned at the surface of the plate.

16. The driveline according to claim 1, wherein the plate is a different shape than the backplate.

17. The driveline according to claim 16, wherein the backplate is circular.

* * * * *